United States Patent
Kuusilinna et al.

(10) Patent No.: US 9,565,609 B2
(45) Date of Patent: Feb. 7, 2017

(54) METHOD AND APPARATUS FOR TRIGGERING HANDOVER BETWEEN ACCESS POINTS BASED ON GATHERED HISTORY DATA OF SERIES OF ACCESS POINTS

(75) Inventors: Kimmo Kalervo Kuusilinna, Tampere (FI); Eero Aho, Tampere (FI); Niko Kiukkonen, Veikkola (FI)

(73) Assignee: Nokia Technologies Oy, Espoo (FI)

(*) Notice: Subject to any disclaimer, the term of this patent is extended or adjusted under 35 U.S.C. 154(b) by 123 days.

(21) Appl. No.: 14/395,402

(22) PCT Filed: May 22, 2012

(86) PCT No.: PCT/FI2012/050485
§ 371 (c)(1),
(2), (4) Date: Oct. 17, 2014

(87) PCT Pub. No.: WO2013/175048
PCT Pub. Date: Nov. 28, 2013

(65) Prior Publication Data
US 2015/0103806 A1    Apr. 16, 2015

(51) Int. Cl.
*H04W 4/00* (2009.01)
*H04W 36/24* (2009.01)
(Continued)

(52) U.S. Cl.
CPC .............. *H04W 36/245* (2013.01); *G01S 5/02* (2013.01); *H04W 36/30* (2013.01); *H04W 64/00* (2013.01); *H04W 36/24* (2013.01)

(58) Field of Classification Search
CPC ..... H04W 36/24; H04W 36/245; H04W 36/30
(Continued)

(56) References Cited

U.S. PATENT DOCUMENTS 5,572,221 A    11/1996    Marlevi et al.
6,711,408 B1    3/2004    Raith
(Continued)

FOREIGN PATENT DOCUMENTS

| EP | 1282327 A2 | 2/2003 |
| WO | 2010/080849 A1 | 7/2010 |
| WO | 2010/093717 A1 | 8/2010 |

OTHER PUBLICATIONS

International Search Report and Written Opinion received for corresponding Patent Cooperation Treaty Application No. PCT/FI2012/050485, mailed Apr. 18, 2013, 23 pages.
(Continued)

*Primary Examiner* — Farah Faroul
(74) *Attorney, Agent, or Firm* — Harrington & Smith (57) ABSTRACT

A method of handover prediction for a mobile device comprises receiving wireless communication service from a first access point; detecting a change in fingerprint data relating to available access points; correlating recent history data of a series of fingerprint data with history data comprised by a history database; determining, in response to the correlation and by using the fingerprint data and the history data, a second access point; and triggering a handover from the first access point to the second access point. The method may further comprise determining fingerprint data relating to available access points; comparing the fingerprint data to known fingerprint data of a fingerprint database; updating the fingerprint database in response to the comparison revealing new fingerprint data; and storing history data of series of fingerprint data reflecting earlier movement of a user to a history database. Identifying unavailable access points and notifying a disconnection to the mobile user.

8 Claims, 6 Drawing Sheets

(51) Int. Cl.
*G01S 5/02* (2010.01)
*H04W 64/00* (2009.01)
*H04W 36/30* (2009.01)

(58) Field of Classification Search
USPC ........................................................ 370/331
See application file for complete search history.

(56) References Cited

U.S. PATENT DOCUMENTS

| | | | |
|---|---|---|---|
| 9,020,552 B1* | 4/2015 | Cocos | H04W 48/16 370/310 |
| 2007/0060126 A1 | 3/2007 | Taniguchi et al. | |
| 2007/0165583 A1 | 7/2007 | Pecen | |
| 2007/0249291 A1* | 10/2007 | Nanda | H04W 36/0083 455/73 |
| 2011/0286437 A1 | 11/2011 | Austin et al. | |
| 2013/0016618 A1* | 1/2013 | Shanmugavadivel | H04L 43/50 370/245 |
| 2013/0095848 A1* | 4/2013 | Gold | H04W 4/023 455/456.1 |
| 2014/0018095 A1* | 1/2014 | Parvizi | H04W 4/043 455/456.1 |
| 2015/0081583 A1* | 3/2015 | Butler | G06Q 10/0833 705/333 |
| 2015/0142983 A1* | 5/2015 | Yilmaz | H04L 67/1095 709/227 |
| 2015/0312722 A1* | 10/2015 | Mori | H04W 4/028 455/456.3 |

OTHER PUBLICATIONS

Sarddar et al., "Reducing Handover Delay by Preselective Scanning Using GPS", International Journal of Distributed and Parallel Systems (IJDPS), vol. 1, No. 2, Nov. 2010, pp. 142-151.

Nielsen et al., "Optimized Cellular Connectivity Using Positioning Data", ICT-217033 Where, Version 1.0, May 11, 2010, pp. 1-38.

Deshpande et al., "Predictive Methods for Improved Vehicular Wifi Access", Proceedings of the 7th international conference on Mobile systems, applications, and services, Jun. 22-25, 2009, pp. 263-276.

* cited by examiner

METHOD AND APPARATUS FOR TRIGGERING HANDOVER BETWEEN ACCESS POINTS BASED ON GATHERED HISTORY DATA OF SERIES OF ACCESS POINTS

RELATED APPLICATION

This application was originally filed as PCT Application No. PCT/FI2012/050485 filed May 22, 2012.

TECHNICAL FIELD

The present invention relates generally to mobile communication system. The invention relates particularly, though not exclusively, to triggering a handover between access points.

BACKGROUND ART

Today's mobile apparatuses provide wide variety of services using plurality of radio networks. Typically, users of the mobile apparatuses use the services in various circumstances, also when moving around. When moving around using the mobile apparatus with an active service requiring a data connection to a radio network, a problem of a limited radio signal operating range may exist.

Achieving disruption free connectivity with radio technologies that are not designed for mobility may be troublesome. For example, non-cellular radio technologies such as Wi-Fi may not have a centralized radio network controller to provide handovers between access points. For example walking ten meters may change Wi-Fi reception from excellent to very poor. Handovers are normally done based on signal strength but Wi-Fi reception changes too rapidly and unexpectedly to allow this. For example, walking with an ongoing Skype (IP) call with a Wi-Fi connection is very risky as the call might be dropped at any time. This problem is especially difficult in cases where the handover is not performed between two commonly managed Wi-Fi access points.

SUMMARY

According to a first example aspect of the invention there is provided a method comprising:
receiving wireless communication service from a first access point;
detecting a change in fingerprint data relating to available access points;
correlating recent history data of a series of fingerprint data with history data comprised by a history database;
determining, in response to the correlation and by using the fingerprint data and the history data, a second access point; and
triggering a handover from the first access point to the second access point.
In an embodiment, the method may further comprise:
estimating a route of a user by correlating at least two most recent fingerprint data of the history data with the series of fingerprint data reflecting earlier movement of the user; and
determining, using the fingerprint data and the estimated route, the second access point.
In an embodiment, the method may further comprise:
determining, using the fingerprint data and the history data, the second access point being unavailable; and
notifying a user of an apparatus before disconnection of the wireless communication service from the first access point.
In an embodiment, any of the access points comprises at least one of the following:
a wireless local area network (WLAN) access point;
a Bluetooth access point;
an ultra-wideband access point; and
a cellular network base station.
In an embodiment, the method may further comprise:
maintaining the fingerprint data in a fingerprint database; and
maintaining the history data in the history database.
In an embodiment, the fingerprint database may be located in at least one of the following:
a user apparatus; and
a server apparatus.
In an embodiment, the history database may be located in at least one of the following:
a user apparatus; and
a server apparatus.
According to a second example aspect of the invention there is provided a method comprising:
determining fingerprint data relating to available access points;
comparing the fingerprint data to known fingerprint data of a fingerprint database;
updating the fingerprint database in response to the comparison revealing new fingerprint data; and
storing history data of series of fingerprint data reflecting earlier movement of a user to a history database.
In an embodiment, the method may further comprise:
determining the fingerprint data relating to available access points using sensors of an apparatus; and
storing the fingerprint data to the history data of a series of fingerprint data.
In an embodiment, the method may further comprise:
determining the fingerprint data relating to available access points using sensors of an apparatus;
transmitting the fingerprint data to a crowdsourcing server;
updating the fingerprint data to a crowdsourcing fingerprint database at the crowdsourcing server; and
receiving, at the apparatus, fingerprint data comprising at least part of the crowdsourcing fingerprint database.
According to a third example aspect of the invention there is provided an apparatus, comprising:
a communication interface configured to receive wireless communication service from a first access point;
a sensor configured to detect fingerprint data;
a processor;
a memory including computer program code;
the memory and the computer program code configured to, with the processor, cause the apparatus to:
detect a change in fingerprint data relating to available access points;
correlate recent history data of a series of fingerprint data with history data comprised by a history database;
determine, in response to the correlation and by using the fingerprint data and the history data, a second access point; and
trigger a handover from the first access point to the second access point.
In an embodiment, the memory and the computer program code are further configured to, with the processor, cause the apparatus to:

estimate a route of a user by correlating at least two most recent fingerprint data of the history data with the series of fingerprint data reflecting earlier movement of the user; and determine, using the fingerprint data and the estimated route, the second access point.

In an embodiment, the memory and the computer program code are further configured to, with the processor, cause the apparatus to:

determine, using the fingerprint data and the history data, the second access point being unavailable; and notify a user of the apparatus before disconnection of the wireless communication service from the first access point.

According to a fourth example aspect of the invention there is provided an apparatus, comprising:

a sensor configured to detect fingerprint data;

a processor;

a memory including computer program code;

the memory and the computer program code configured to, with the processor, cause the apparatus to:

determine fingerprint data relating to available access points;

compare the fingerprint data to known fingerprint data of a fingerprint database;

update the fingerprint database in response to the comparison revealing new fingerprint data; and store history data of series of fingerprint data reflecting earlier movement of a user.

In an embodiment, the memory and the computer program code are further configured to, with the processor, cause the apparatus to:

store the fingerprint data to the history data of a series of fingerprint data.

In an embodiment, the memory and the computer program code are further configured to, with the processor, cause the apparatus to:

determine the fingerprint data relating to available access points;

transmit the fingerprint data to a crowdsourcing server;

update the fingerprint data to a crowdsourcing fingerprint database at the crowdsourcing server; and receive, at the apparatus, fingerprint data comprising at least part of the crowdsourcing fingerprint database.

According to a fifth example aspect of the invention there is provided a computer program embodied on a computer readable medium comprising computer executable program code which, when executed by at least one controller of an apparatus, causes the apparatus to:

receive wireless communication service from a first access point;

detect a change in fingerprint data relating to available access points;

correlate recent history data of a series of fingerprint data with history data comprised by a history database;

determine, in response to the correlation and by using the fingerprint data and the history data, a second access point; and trigger a handover from the first access point to the second access point.

According to a sixth example aspect of the invention there is provided a computer program embodied on a computer readable medium comprising computer executable program code which, when executed by at least one controller of an apparatus, causes the apparatus to:

determine fingerprint data relating to available access points;

compare the fingerprint data to known fingerprint data of a fingerprint database;

update the fingerprint database in response to the comparison revealing new fingerprint data; and store history data of series of fingerprint data reflecting earlier movement of a user.

Any foregoing memory medium may comprise a digital data storage such as a data disc or diskette, optical storage, magnetic storage, holographic storage, opto-magnetic storage, solid state memory, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
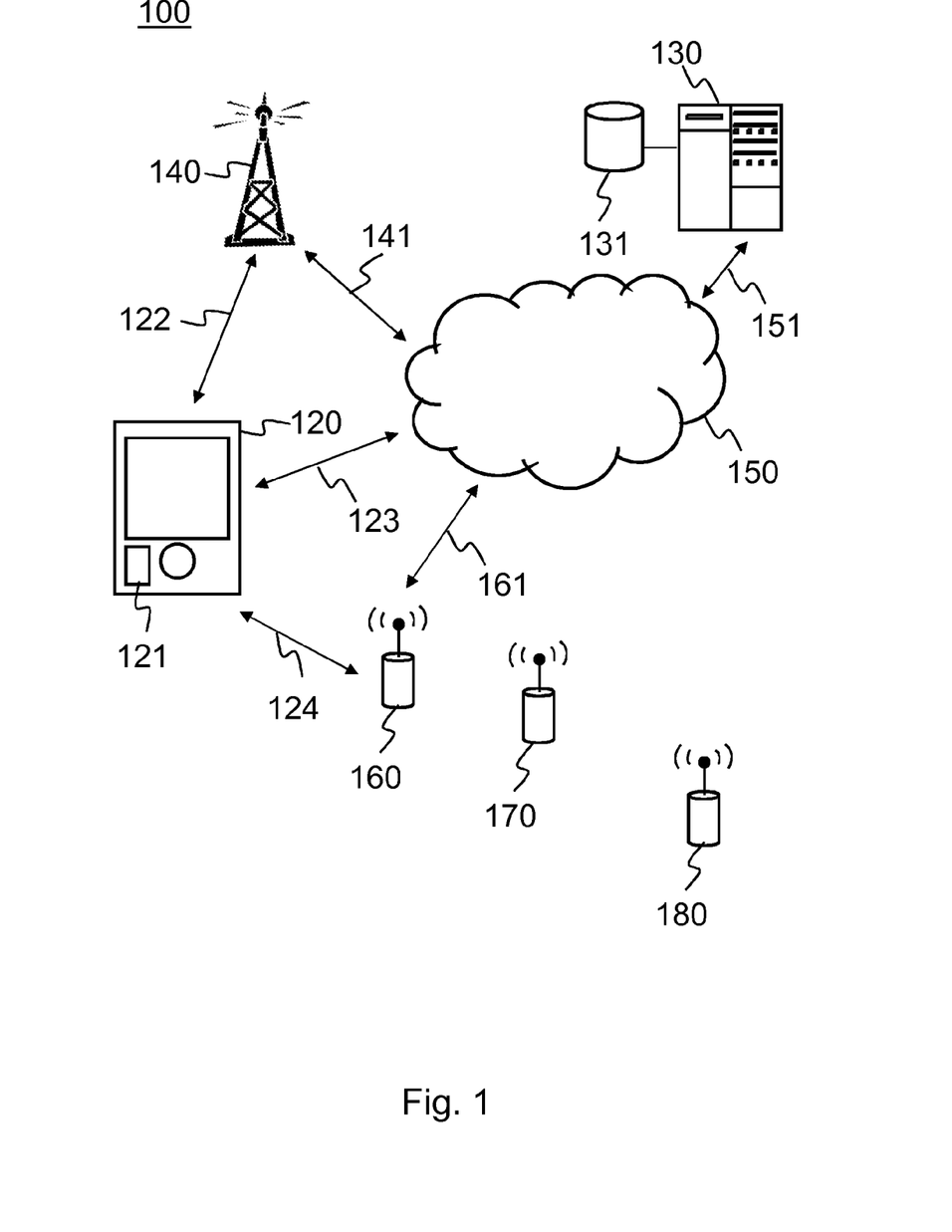
FIG. 1 shows some details of the system architecture in which various embodiments of the invention may be applied.

FIG. 1 shows some details of the system 100, in which various embodiments of the invention may be applied.

In an embodiment, a user apparatus 120 may comprise a mobile phone, a personal digital assistant (PDA), an internet tablet or a laptop computer, for example. The user apparatus 120 is capable of downloading and locally executing software program code. The software program code may be a client application of a service whose server application is running on the server apparatus 130 of the system 100. The user apparatus 120 may comprise a sensor 121, such as a radio unit, for measuring data for a radio frequency fingerprint, for example. The fingerprint data may comprise information of visible access points 160, 170, 180 and base stations 140, for example.

The user apparatus 120 may be configured to be connectable to a wireless cellular network over a wireless connection 122. The wireless connection 122 may comprise a mobile cellular network access, for example. The user apparatus 120 may also be configured to be connectable to a wireless non-cellular network over a wireless connection 124. The wireless connection 124 may comprise a wireless local area network (WLAN) connection, for example Wi-Fi connection. The wireless cellular and non-cellular network may be connected to a public data communication network 150, for example the Internet, over a data connection 141, 161, respectively. The user apparatus 120 may also be configured to be connectable to a public data communication network 150 over a data connection 123.

In an embodiment, the system 100 comprises a server apparatus 130, which comprises a storage device 131 for storing fingerprint data received from the user apparatus 120 over a data connection 150, 151. The storage device 131 may store fingerprint data for a personal data of the user or as a crowdsourcing data for plurality of users. Furthermore, history data of earlier series of fingerprint data may be stored to the storage device 131 for representing earlier routes of users.

Figure 2A:
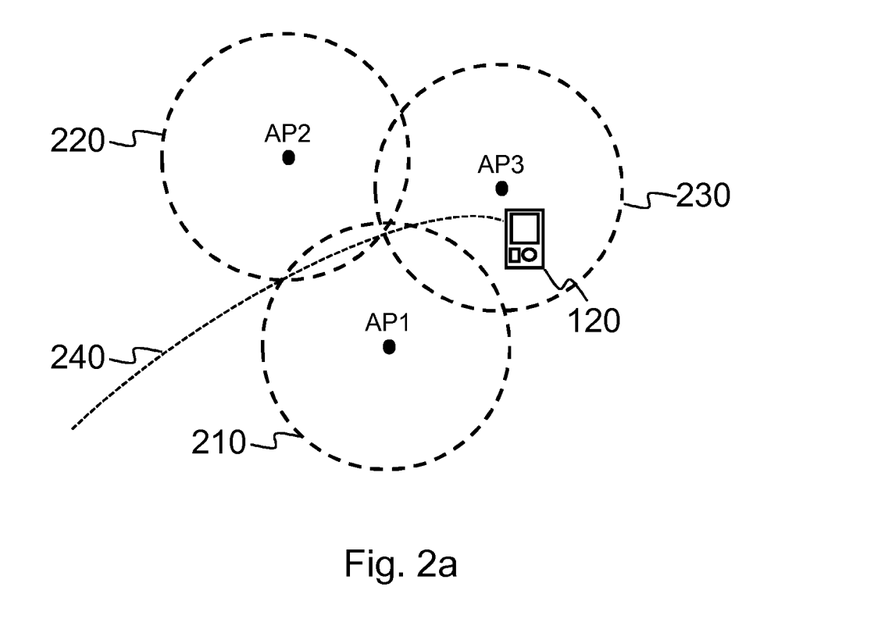
FIG. 2a shows a schematic view of a moving apparatus collecting fingerprint and history data, in which various embodiments of the invention may be applied.

FIG. 2a shows a schematic view of a moving apparatus 120 collecting fingerprint and history data, in which various embodiments of the invention may be applied.

Fingerprint and movement history data may be collected using the apparatus 120 when moving along a route 240, for example. The radio fingerprint data may be collected during the user movement using at least one sensor of the apparatus 120. The fingerprint data collection may be active all the time or switched on by the user. The fingerprint data collection is done to achieve history database about the routes the user tends to use. Especially, Wi-Fi access point fingerprint data may be collected based on radio signals from Wi-Fi access points AP1-AP3. Operation ranges 210-230 illustrate the typical service areas for each access point AP1-AP3, respectively. However, also other radio fingerprint data may be collected for reliable route definition, such as cellular base station fingerprint data or other non-cellular access point data, for example Bluetooth or ultra-wideband. In an embodiment, the apparatus 120 moves along the route 240 and measures fingerprint data during the route 240. In case the measured fingerprint data is determined to be a new one, fingerprint data as well as history data may be updated. In case the measured fingerprint is not a new one, history data is updated. The fingerprint data and the history data may be stored to a fingerprint database or to a history database located in the apparatus 120 or at a network server.

Figure 2B:
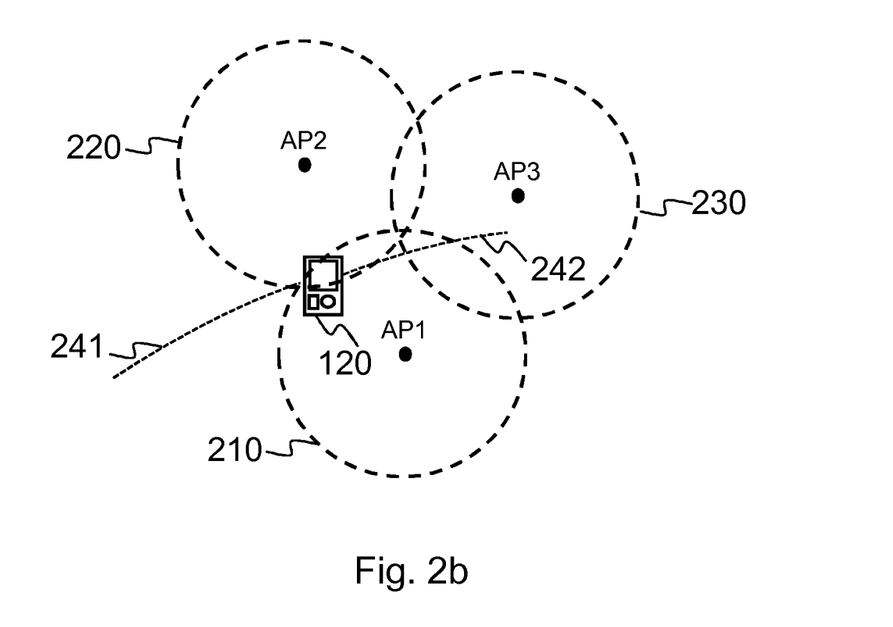
FIG. 2b shows a schematic view of a moving apparatus, when the collected radio fingerprint and movement history data may be utilized for a handover.

FIG. 2b shows a schematic view of a moving apparatus 120, when the collected radio fingerprint and movement history data may be utilized for a handover. A moved real route 241 may be tracked by radio fingerprinting. An estimated route 242 may be determined based on the radio fingerprinting and collected movement history data. The movement history data may contain routes the user tends to use, but also crowdsourced routes may be used (people tend to move along a road, not towards a wall). In an embodiment, in FIG. 2b, the user apparatus is connected to Wi-Fi access point AP1. By using the fingerprint data and history data the apparatus 120 is estimated to travel along path 242 and a handover to Wi-Fi access point AP3 may be triggered when entering a range 230, for example.

Figure 3:
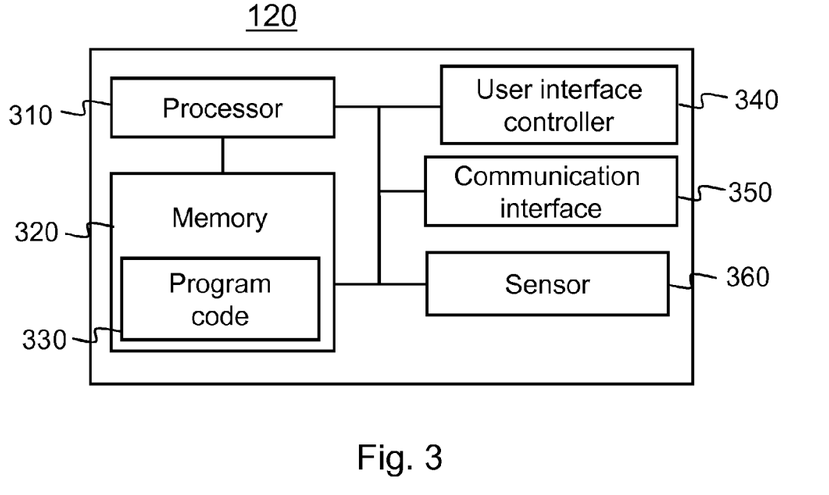
FIG. 3 presents an example block diagram of an apparatus in which various embodiments of the invention may be applied.

FIG. 3 presents an example block diagram of an apparatus 120 in which various embodiments of the invention may be applied. The apparatus 120 may be a user equipment (UE), user device or apparatus, such as a mobile terminal, a smart phone, a personal digital assistant (PDA), a laptop, a tablet or other communication device.

The general structure of the apparatus 120 comprises a user interface controller 340, a communication interface 350, a processor 310, and a memory 320 coupled to the processor 310. The apparatus 120 further comprises software 330 stored in the memory 320 and operable to be loaded into and executed in the processor 310. The software 330 may comprise one or more software modules and can be in the form of a computer program product. The apparatus 120 may further comprise a sensor 360 for detecting fingerprint data. The sensor 360 may also be integrated to another element of the apparatus 120, for example to the communication interface 350.

The processor 310 may be, e.g., a central processing unit (CPU), a microprocessor, a digital signal processor (DSP), a graphics processing unit, or the like. FIG. 3 shows one processor 310, but the apparatus 120 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 120 may comprise a plurality of memories. The memory 320 may be constructed as a part of the apparatus 120 or it may be inserted into a slot, port, or the like of the apparatus 120 by a user. The memory 320 may serve the sole purpose of storing data, or it may be constructed as a part of an apparatus serving other purposes, such as processing data. Fingerprint data and history data may be stored to the memory 320.

The user interface controller 340 may comprise circuitry for receiving input from a user of the apparatus 120, e.g., via a keyboard, graphical user interface shown on the display of the user apparatus 120, speech recognition circuitry, or an accessory device, such as a headset, and for providing output to the user via, e.g., a graphical user interface or a loudspeaker.

The sensor 360 is configured to provide fingerprint data. Such data may comprise, for example, information on available access points. History data may comprise a series of fingerprint data representing earlier routes travelled by the user associated with the apparatus 120.

The communication interface module 350 implements at least part of radio transmission. The communication interface module 350 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 350 may be integrated into the user apparatus 120, or into an adapter, card or the like that may be inserted into a suitable slot or port of the apparatus 120. The communication interface module 350 may support one radio interface technology or a plurality of technologies. The apparatus 120 may comprise a plurality of communication interface modules 350. Wireless communication data, fingerprint data and history data may be transmitted to a network using the communication interface 350.

A skilled person appreciates that in addition to the elements shown in FIG. 3, the apparatus 120 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 120 may comprise a disposable or rechargeable battery (not shown) for powering when external power if external power supply is not available.

Figure 4:
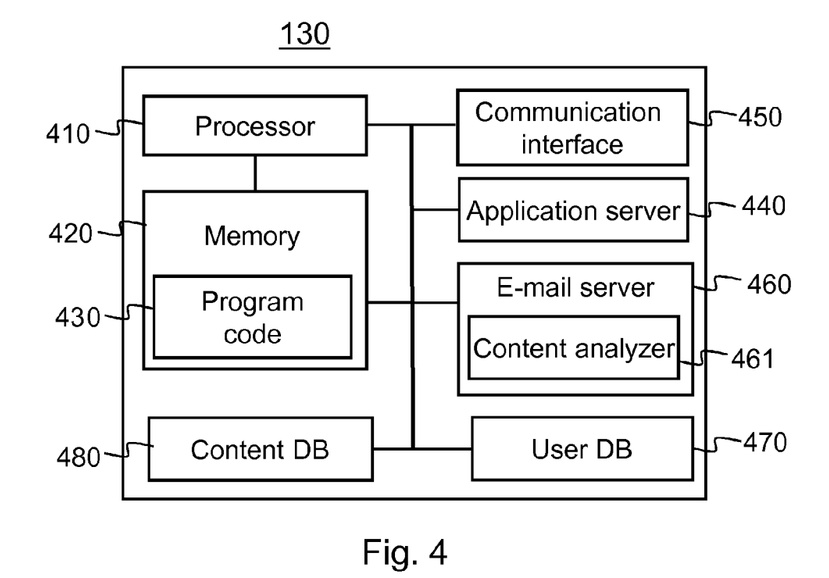
FIG. 4 presents an example block diagram of a server apparatus in which various embodiments of the invention may be applied.

FIG. 4 presents an example block diagram of a server apparatus 130 in which various embodiments of the invention may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of radio transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. The server apparatus 130 may comprise a plurality of communication interface modules 450. Fingerprint data and history data from the user apparatus 120 may be received by the server apparatus 130 using the communication interface 450.

The e-mail server process 460 receives e-mail messages sent from user apparatuses 120 via the network 150. The server 460 may comprise a content analyzer module 461, which checks if the content of the received message meets the criteria that are set for new content data of the service, such as crowdsourcing service. The content analyzer module 461 may for example check, whether the e-mail message contains valid fingerprint data or history data. The valid fingerprint data received by the e-mail server is then sent to an application server 440, which provides application services e.g. relating to the user accounts stored in a user database 470 and content of the content management service. Content provided by the system is stored in a content database 480. The content may comprise fingerprint data and history data for crowdsourcing service or for personal service for the user originally transmitting the data to the server 130.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
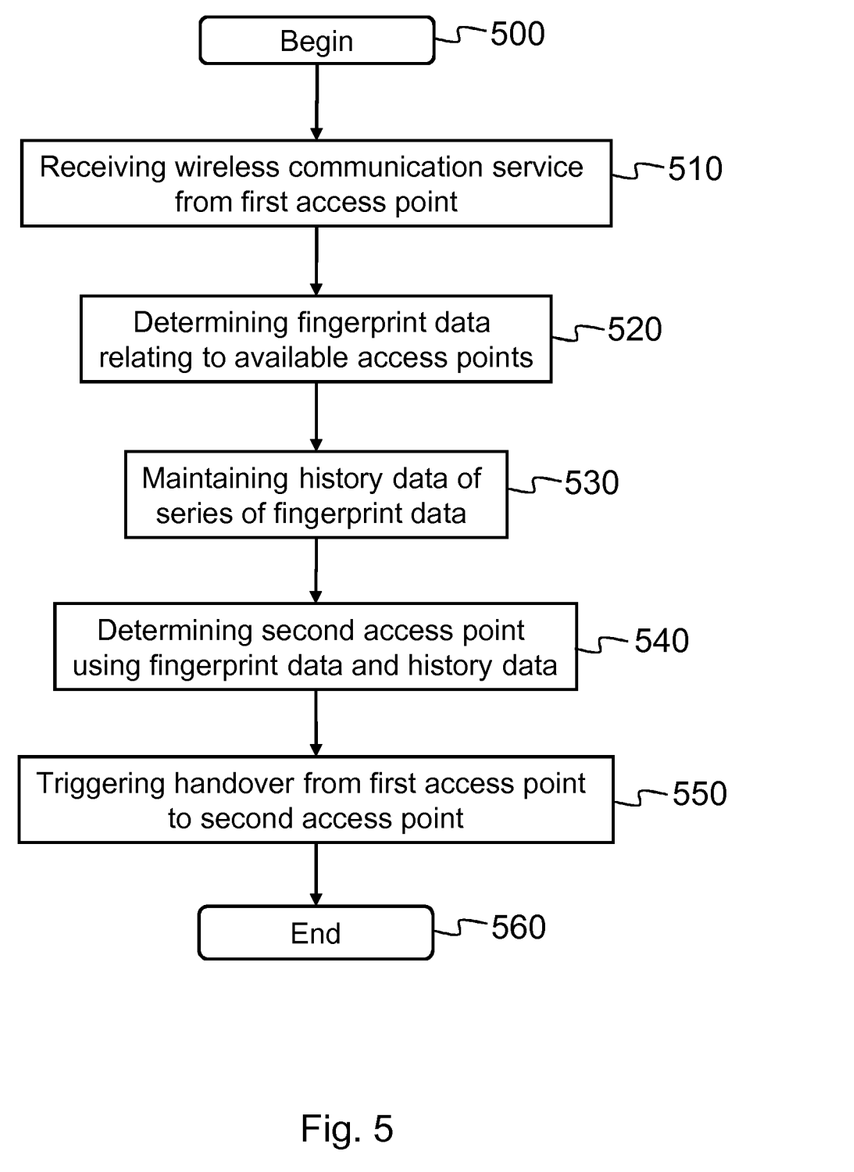
FIG. 5 shows a flow diagram showing operations in accordance with an example embodiment of the invention.

FIG. 5 shows a flow diagram showing operations in accordance with an example embodiment of the invention. In step 500, the method is started. In step 510, wireless communication service is received from a first access point. In step 520, determining fingerprint data relating to available access points. In step 530, history data of series of fingerprint data is maintained reflecting earlier movement of a user. In step 540, a second access point is determined using the fingerprint data and the history data. In step 550, a handover is triggered from the first access point to the second access point. The method ends in step 560.

Figure 6:
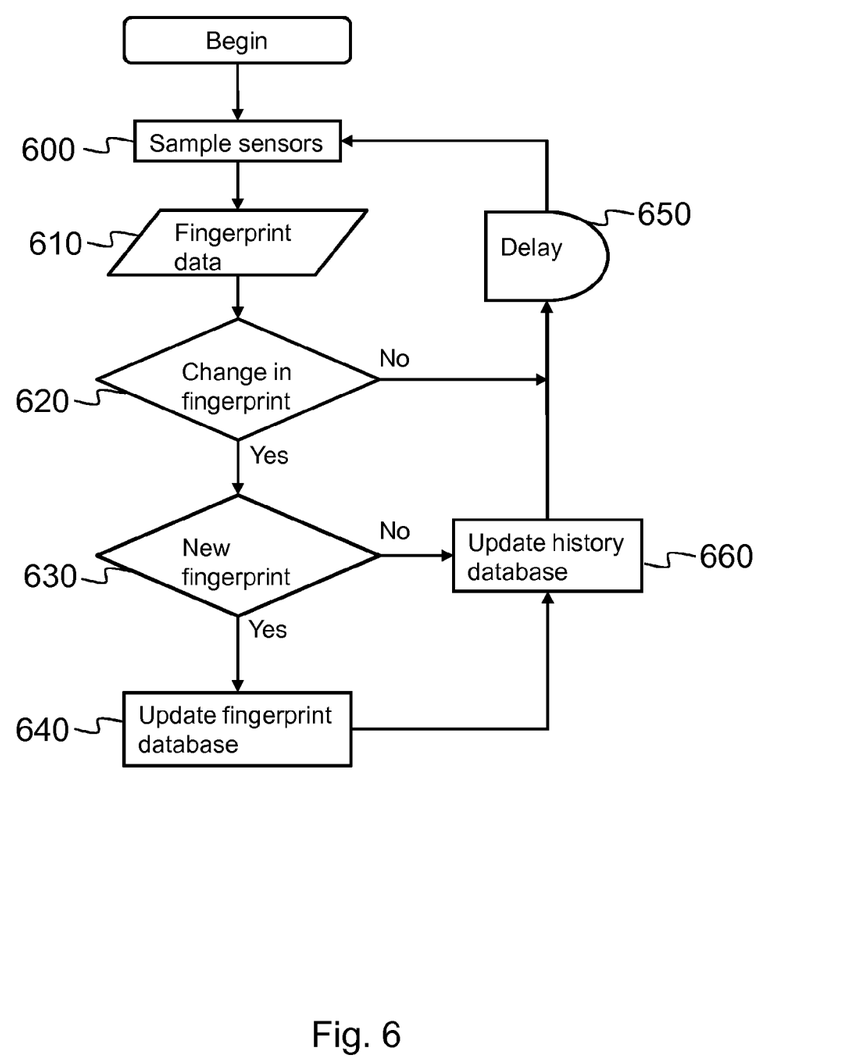
FIG. 6 shows fingerprint and history data collection process in accordance with an example embodiment of the invention.

FIG. 6 shows fingerprint and history data collection process in accordance with an example embodiment of the invention.

In an embodiment, a radio handover is triggered for the user apparatus based on radio fingerprint data and history data. After beginning, in phase 600 of FIG. 6, fingerprint data may be collected from the surrounding world using sample sensors of apparatuses. The fingerprint data may comprise potentially any data measurable by the sensors. In an embodiment, Wi-Fi access point identifiers (IDs) and signal strengths of the access points are detected. Furthermore, signal-to-noise ratios (SNR) and delays may be detected. Location information, such as satellite based positioning information (GPS) may also be detected. In phase 610, fingerprint data collection is done. Data collection can be centrally done by an organization. Crowdsourced data is an option to gather appropriate fingerprint and history data to a server and available for users. When needed, at least part of the fingerprint data and the history data may be transferred to the apparatus from the server. Data collection may be also done by the user herself, in which case a training period is needed to collect a representative set of data.

In an embodiment, the fingerprint data may comprise following information elements, for example:

"fpid" : unique fingerprint identifier
-----------------------------------
"WLAN access point information"
  "ssid" : SSID, service set identifier
  "bssid" : BSSID, Basic service set identification
  "channel" : channel number
  "encryption" : encryption protocol, e.g. TKIP or AES
  "security" : Security, e.g Open, WEP, WPA_PSK, WPA_EAP, WP2
  "signal strength" : signal strength, [dBm]
  "type" : Infrastructure or Ad-Hoc
-----------------------------------
"Cellular base station information"
(First information set is the base station that the phone is connected to.

-continued

```
Other information sets are for surrounding base stations)
    "id" : identifier
    "type" : WCDMA or GSM
    "mcc" : Mobile country code
    "mnc" : Mobile network code
    "channel number" : Channel number
    "RSSI" : RX power level [dBm]
    "SC" : Primary scrambling code
-----------------------------------
"location" : GPS location
"device" : information about the device
"time" : time fingerprint was taken [ms, Epoch/Unix time]
```

In an embodiment, the fingerprint data with example values for the information elements may comprise for example following:

```
"fpid" : 1331806469276541
-----------------------------------
"access points" :
    "ssid" : "AP1",
    "bssid" : "a6:63:3e:3a:20:5e",
    "channel" : 52,
    "encryption" : 0,
    "security" : 0,
    "signal strength" : −65,
    "type" : "Infrastructure",
    "ssid" : "AP2",
    "bssid" : "a6:63:3e:3a:40:6a",
    "channel" : 6,
    "encryption" : 10,
    "security" : 2,
    "signal strength" : −71,
    "type" : "Infrastructure".
-----------------------------------
"cells" :
    "id" : 733567,
    "type" : "WCDMA"
    "mcc" : 244,
    "mnc" : 3,
    "channel number" : 10323,
    "RSSI" : −22,
    "SC" : 320,
    "id" : 713521,
    "type" : "WCDMA"
    "channel number" : 10234,
    "RSSI" : −35,
    "SC" : 103,
-----------------------------------
"location" :
    "accuracy" : 59.069172,
    "latitude" : 65.447682,
    "longitude" : 25.863523,
"device" :
    "manufacturer" : "Nokia",
    "model" : "N9"
"time" : 1331806469276
```

In phase 620 of FIG. 6, a possible change in the fingerprint data is checked. In case there is no change in fingerprint data, the user probably is not moving and after a certain delay of time 650 a return to phase 600 may be done. In case the fingerprint data is changed in phase 620, the process proceeds to phase 630. In phase 630, the detected fingerprint data is compared to the earlier stored fingerprint data. In case the fingerprint data is not novel compared to the fingerprint data stored in the fingerprint database, history data of the history database is updated in phase 660 to comprise the latest series of fingerprint data representing a route of the user. In case the fingerprint data in phase 630 is regarded as novel compared to the fingerprint data stored in the fingerprint database, the fingerprint database is updated in phase 640 with the new fingerprint data and after that the history data of the history database is updated in phase 660.

In an embodiment, the history data may comprise following information elements, for example:
"user ID": User identifier for the history data
"History data records":
    record1
    record2
    record3

In an embodiment, the records may contain following information:
"record id": identifier for the record
"device id": identifier for the device that took the record
"time": time for the record
"fpid": reference to fingerprint id in fingerprint database It should be noted, that the fingerprint and history data examples shown above illustrate just examples. Also other variations are possible. Moreover, most of the shown parameters are optional and additional parameters may be available as well. In addition, history database could also contain actual fingerprint data instead of reference to fingerprint database.

In an embodiment, the fingerprint data and the history data may be collected and stored by the user apparatus 120. Alternatively the data may be collected by the user apparatus 120 but stored to the server 130 for later utilization by the user.

In an embodiment, the fingerprint data and the history data of user behavior (movements) may be collected using crowdsourcing. Crowdsourced movement data may also be useful, e.g. when moving along a road or a corridor because such movement is pretty predictable and does not depend too much on the specific individual. The collected data, "user behavior," may be defined as a time series of fingerprint data.

Figure 7:
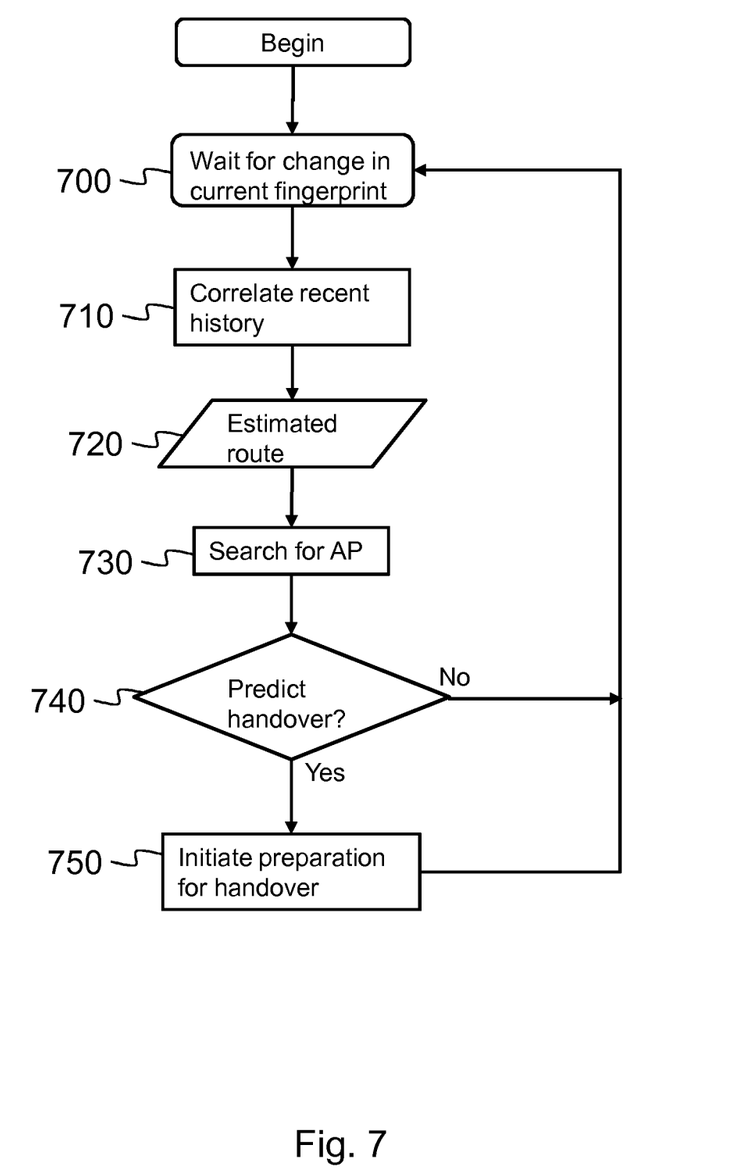
FIG. 7 shows fingerprint and history data utilization process for handover triggering in accordance with an example embodiment of the invention.

FIG. 7 shows fingerprint and history data utilization process for handover triggering in accordance with an example embodiment of the invention.

In an embodiment, the fingerprint data and the history data may be used to estimate which data carrier or access point should be the next target of a handover and prepare for the handover respectively.

After beginning, in phase 700 of FIG. 7, a change in current fingerprint data is waited for. When the fingerprint data is detected to be changed, the latest history data is correlated in phase 710 with the series of fingerprint data comprised by the history data. As a result of the correlation, a best match may be found that correlates the estimated route of the apparatus as in phase 720. Based on the estimated route of phase 720 the next access point on that route may be determined. In phase 730, the determined access point may be searched to cover the estimated route. In phase 740 a possible handover is predicted. If the estimated route, determined by correlation from the history data, predicts that a certain access point is used as a target for handover, preparation for the handover is initiated as in phase 750 of FIG. 7. If the prediction of handover in phase 740 results as negative, the process moves back to phase 700. In case the estimated route determined using the fingerprint data and the history data predicts that there is no access point for handover, a notification to the user may be presented. Such notification may be very useful for avoiding the connection loss. The user may decide to stop moving in response to the notification to maintain the connection, such as an IP call, and finish the connection in a controlled way.

In an embodiment, the notification may comprise at least one of the following:
    a sound presented to the user, for example a beep hearable by the user during a voice call;

a message displayed to the user interface of the apparatus, for example using a pop-up window visible to the user during a video stream;

a light signal, for example an indication using a light emitting diode (LED); and a tactile feedback provided to the user, for example a vibration.

Thus, the information of past movements and existing radio networks may be used along the predicted path to select the best available data bearer and the access point. Alternatively, the history data can be used to notice that the successful handover is not possible before the actual handover is triggered avoiding the situations leading to trial and error behavior. In an embodiment, the user could be warned if she is approaching a situation it is predicted that a handover cannot be made. This could be e.g. a distinctive warning sound or a message displayed in the user interface.

Combining the fingerprint and history movement data to form the handover decision enables making handover decisions that are not just based on the currently visible radio signal strengths and/or satellite based positioning system, such as GPS. Especially in indoor environment or apparatuses without GPS, where satellite based positioning system does not work, the disclosed solution is effective. In addition, running GPS continuously just for handover purpose is quite energy inefficient. Furthermore, GPS based operation would demand also access points to be geo-tagged.

In an embodiment, geo-location information could be used together with the fingerprint data and the history data to assist in the process. The geo-location information may be stored in the user apparatus and used to point out impossible routes, for example. Such route may comprise, for example, a route directing straightly towards a wall.

In an embodiment, other radio technologies than Wi-Fi may be used. Such radios comprise at least one of the following: cellular radios (particularly femto or pico base stations), TV whitespace radios, Bluetooth radios, ultra-wideband radios and WiMAX radios.

Fingerprint sampling rate may be required to be relatively high to improve the effectiveness of the method. In addition, the amount of data received from a crowdsourcing server for fingerprint data and history data may become huge.

However, not all data is required to be stored by the user apparatus. In an embodiment, only data related to user's own typical routes may be stored to the apparatus. Moreover, fingerprint sampling in areas with good signal strength may be coarser than in areas where signal strength is weak (where information is needed for possible handover). In addition, sampling may be restricted only to those access points that the user apparatus tends to utilize or can utilize (open access points or access points for which the user has a key).

In an embodiment, as the user is typically connected to the Internet, a full database of fingerprint data and history data may be implemented in a cloud in the Internet. Fingerprint related data of the user's surroundings are pre-emptively cached in a memory of the user apparatus. Such implementation also supports crowdsourced collection of fingerprint related data. In an embodiment, the whole method (except tracking fingerprint data) may be carried out in the cloud.

Crowdsourced fingerprint data may comprise some "holes". However, user's own typical routes may be tracked well since the history data is collected during user's movements along those routes. As the described method is used more and more, the experience will get better for every user of the crowdsourcing service.

In an embodiment, the fingerprint database and the history database may be located at the user apparatus or at the server apparatus.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method comprising:

receiving, by an apparatus, wireless communication service from a first access point;

detecting, by the apparatus, a change in fingerprint data relating to available access points;

correlating, by the apparatus, recent history data of a series of fingerprint data with history data comprised by a history database;

estimating, by the apparatus, a route of a user by correlating at least two most recent fingerprint data of the history data with the series of fingerprint data reflecting earlier movement of a user;

determining, by the apparatus, in response to the correlation and by using the fingerprint data, the history data and the estimated route, a second access point; and triggering a handover from the first access point to the second access point.

2. The method of claim 1, further comprising:

determining, by the apparatus, using the fingerprint data and the history data, the second access point being unavailable; and notifying, by the apparatus, a user of an apparatus before disconnection of the wireless communication service from the first access point.

3. An apparatus, comprising:

a communication interface configured to receive wireless communication service from a first access point;

a sensor configured to detect fingerprint data; a processor;

a memory including computer program code;

the memory and the computer program code configured to, with the processor, cause the apparatus to:

detect a change in fingerprint data relating to available access points;

correlate recent history data of a series of fingerprint data with history data comprised by a history database;

estimate a route of a user by correlating at least two most recent fingerprint data of the history data with the series of fingerprint data reflecting earlier movement of the apparatus;

determine, in response to the correlation and by using the fingerprint data, the history data, and the estimated route, a second access point; and trigger a handover from the first access point to the second access point.

4. The apparatus of claim 3, wherein the memory and the computer program code are further configured to, with the processor, cause the apparatus to:

determine, using the fingerprint data and the history data, the second access point being unavailable; and notify a user of the apparatus before disconnection of the wireless communication service from the first access point.

5. The apparatus of claim 3, wherein any of the access points comprises at least one of the following:

a wireless local area network (WLAN) access point; a Bluetooth access point;

an ultra-wideband access point;

and a cellular network base station.

6. The apparatus of claim 3, wherein the memory and the computer program code are further configured to, with the processor, cause the apparatus to:

maintain the fingerprint data in a fingerprint database; and maintain the history data in the history database.

7. The apparatus of claim 6, wherein the fingerprint database may be located in at least one of the following:

a user apparatus; and a server apparatus.

8. The apparatus of claim 6, wherein the history database may be located in at least one of the following:

a user apparatus; and a server apparatus.

* * * * *